United States Patent
Chen et al.

(10) Patent No.: US 9,775,222 B1
(45) Date of Patent: Sep. 26, 2017

(54) WIRELESS DETECTION AND CONTROL DEVICE, AND LIGHTING DEVICE HAVING THE SAME

(71) Applicant: HEP TECH CO., LTD., Taichung (TW)

(72) Inventors: Po-Yen Chen, Taipei (TW); Ta-Sheng Hung, Taichung (TW); Chen-Yu Liu, Taichung (TW)

(73) Assignee: HEP TECH CO., LTD., Taichung (TW)

( * ) Notice: Subject to any disclaimer, the term of this patent is extended or adjusted under 35 U.S.C. 154(b) by 0 days.

(21) Appl. No.: 15/433,116

(22) Filed: Feb. 15, 2017

(30) Foreign Application Priority Data

Jul. 15, 2016 (TW) .............................. 105122497 A (51) Int. Cl.
*H05B 37/02* (2006.01)
*H05B 41/36* (2006.01)
*H05B 33/08* (2006.01)

(52) U.S. Cl.
CPC ..... *H05B 37/0272* (2013.01); *H05B 33/0842* (2013.01); *H05B 37/0218* (2013.01); *H05B 37/0227* (2013.01); *H05B 37/0254* (2013.01); *H05B 41/36* (2013.01)

(58) Field of Classification Search
CPC H05B 37/02; H05B 37/0218; H05B 37/0227; H05B 37/0242; H05B 37/0254; H05B 37/0272; H05B 41/36; H05B 33/08

USPC ....... 315/149, 150, 152, 158, 160, 224–226, 315/291, 307, 308, 312, 360
See application file for complete search history.

(56) References Cited

U.S. PATENT DOCUMENTS

| | | | | |
|---|---|---|---|---|
| 2010/0176733 A1* | 7/2010 | King | .................. | H05B 37/0245 315/158 |
| 2014/0252961 A1* | 9/2014 | Ramer | ............... | H05B 33/0842 315/151 |

* cited by examiner

*Primary Examiner* — Jimmy Vu
(74) *Attorney, Agent, or Firm* — WPAT, PC (57) ABSTRACT

A wireless detection and control device is provided, which is applicable a lighting device, and may include a first connection interface, a processing module, a detection module and a control module. The first connection interface may be detachably coupled to the power conversion module of the lighting device. The processing module may be coupled to the first connection interface. The detection module may include two second connection interfaces, and be detachably coupled to the processing module via one of the second connection interfaces; the detection module may detect the change of the surrounding environment to generate a detection signal. The control module may be detachably coupled to the processing module. The detection module may transmit the detection signal to the power conversion module, or transmit the detection signal to the control module for the control module to generate a control signal accordingly so as to control a controlled device.

20 Claims, 5 Drawing Sheets

WIRELESS DETECTION AND CONTROL DEVICE, AND LIGHTING DEVICE HAVING THE SAME

CROSS REFERENCE TO RELATED APPLICATION

This application also claims priority to Taiwan Patent Application No. 105122497 filed in the Taiwan Patent Office on Jul. 15, 2016, the entire content of which is incorporated herein by reference.

TECHNICAL FIELD

The present invention relates to a wireless detection and control device, in particular to a wireless detection and control device applicable to a lighting device. The present invention further relates to a lighting device having the wireless detection and control device.

BACKGROUND

The conventional wireless detection and control device can be installed on a lighting device via a plug & play interface; besides, the conventional wireless detection and control device includes a detection module, which can be used to detection the change of the surrounding environment and then control the lighting device accordingly.

However, as the detection module of the conventional wireless detection and control device should be installed on the circuit board of the conventional wireless detection and control device during the manufacturing process; therefore, the users cannot freely select the type of the detection module; accordingly, the conventional wireless detection and control module can provide the detection function, but cannot completely satisfy the requirements of the users, which is very inflexible in use.

Besides, the conventional wireless detection and control device can be only used to control the lighting device, but cannot be used to control other devices, which limits the application of the wireless detection and control device.

Thus, it has become an important issue to provide a wireless detection and control device in order to improve the shortcomings of the conventional wireless detection device.

SUMMARY

A wireless detection and control device is provided, which is applicable a lighting device, and may include a first connection interface, a processing module, a detection module and a control module. The first connection interface may be detachably coupled to the power conversion module of the lighting device. The processing module may be coupled to the first connection interface. The detection module may include two second connection interfaces, and may be detachably coupled to the processing module via one of the second connection interface; the detection module may detect the change of the surrounding environment to generate a detection signal. The control module may be detachably coupled to the processing module. The detection module may transmit the detection signal to the power conversion module, or may transmit the detection signal to the control module for the control module to generate a control signal accordingly so as to control a controlled device.

A lighting device is provided, which may include a power conversion module, a lighting module and a wireless detection and control module; wireless detection and control module may include a first connection interface, a processing module, a detection module and a control module. The first connection interface may be detachably coupled to the power conversion module, and the power conversion module may be coupled to the lighting module. The processing module may be coupled to the first connection interface. The detection module may include two second connection interfaces, and may be detachably coupled to the processing module via one of the second connection interface; the detection module may detect the change of the surrounding environment to generate a detection signal. The control module may be detachably coupled to the processing module. The detection module may transmit the detection signal to the power conversion module, or may transmit the detection signal to the control module for the control module to generate a control signal accordingly so as to control a controlled device.

The wireless detection and control device, and the lighting device having the same in accordance with the present disclosure may have the following advantages:

(1) According to one embodiment of the present invention, the processing module of the wireless detection and control module may include a third connection interface, so the processing module may be detachably coupled to a detection module via the third connection interface; besides, the detection module may also include two third connection interface, so the detection module may be coupled to other detection modules in series; thus, the users can freely select the types of the detection modules according to the requirements, which is more flexible in use.

(2) According to one embodiment of the present invention, the control module may generate a control signal according to the detection signal of the detection module in order to wiredly or wirelessly control a controlled device; thus, the wireless detection and control device can not only control the lighting device, but also can control other controlled devices, which is more extensive in application.

(3) According to one embodiment of the present invention, the processing module of the wireless detection and control module may include a third connection interface, so the processing module may be detachably coupled to a control module via the third connection interface; besides, the control module may also include two third connection interfaces, so the control module may be coupled to other control modules in series; the users can freely select the types of the control modules according to the requirements, which is more flexible in use.

(4) According to one embodiment of the present invention, the wireless detection and control module may have several different detection modules and several different control modules, so can provide various detection functions and control functions; thus, the wireless detection and control device can provide abundant and diverse functions.

(5) According to one embodiment of the present invention, the processing module of the wireless detection and control module may be selectively coupled to one or more detection modules in series, or one or more control modules; therefore, the users can choose to purchase the detection modules and the control modules which the users want to use, which can further satisfy the requirements of the users and increase the commercial value of the product.

Further scope of applicability of the present application will become more apparent from the detailed description given hereinafter. However, it should be understood that the detailed description and specific examples, while indicating exemplary embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings which are given by way of illustration only, and thus are not limitative of the present invention and wherein.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Figure 1:
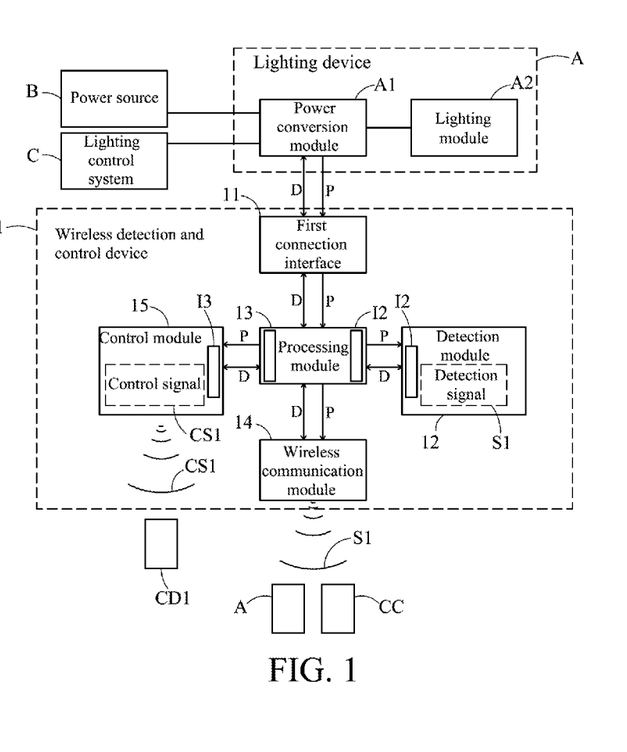
FIG. 1 is a schematic view of a first embodiment of a wireless detection and control device in accordance with the present invention.

Please refer to FIG. 1, which is a schematic view of a first embodiment of a wireless detection and control device in accordance with the present invention. As shown in FIG. 1, the wireless detection and control device 1 may be coupled to a lighting device A, and the lighting device A may include a power conversion module A1 and a lighting module A2; the power conversion module A1 may be coupled to the power source B and the lighting control system C, and controlled by the lighting control system C. The wireless detection and control device 1 may include a first connection interface 11, a detection module 12, a processing module 13, a wireless communication module 14 and a control module 15.

The first connection interface 11 may be detachably coupled to the power conversion module A1 of the lighting device A, and the power conversion module A1 may be coupled to the lighting module A2 of the lighting device A; in a preferred embodiment, the first connection interface 11 may be a plug & play interface, such as a USB interface, etc.

The processing module 13 may be coupled to the first connection interface 11 and may include a second connection interface I2 and a third connection interface I3; in a preferred embodiment, the processing module 13 may be a microcontroller (MCU), etc.

The detection module 12 may include a second connection interface I2, and may be detachably coupled to the second connection interface I2 of the processing module 13 via its second connection interface I2; the detection module 12 may detect the change of the surrounding environment to generate a detection signal S1; in a preferred embodiment, the second connection interface I2 may be a I²C interface; in a preferred embodiment, the detection module 12 may be temperature detector, light detector, humidity detector, $CO_2$ detector, CO detection, gas detector, smoke detector and body detector; in a preferred embodiment, the wireless detection and control module may include a plurality of detection modules 12, and the detection modules 12 may include two or more of temperature detector, light detector, humidity detector, $CO_2$ detector, CO detection, gas detector, smoke detector and body detector.

The wireless communication module 14 may be coupled to the processing module 13. The detection module 12 may transmit the detection signal S1 to the power conversion module A1 or transmit the detection signal S1 to the wireless communication module 14 in order to transmit the detection signal S1 to other lighting devices A or the control center CC.

In this way, the lighting device A may operate according to the detection signal S1; in addition, the detection module 12 may further transmit the detection signal S1 to other lighting devices A via the wireless communication module 14 so as to control other lighting devices A to operate according to the detection signal S1, or transmit the detection signal S1 to the control center CC for the control center CC to take the necessary measures according to the detection signal S1.

The control module 15 may include a third connection interface I3, and the control module 15 may be detachably coupled to the third connection interface I3 of the processing module 13 via its third connection interface I3; in a preferred embodiment, the third connection interface I3 may be a RS485 interface. The detection module 12 may transmit the detection signal S1 to the control module 15, and the control module 15 may generate a control signal CS1 according to the detection signal S1 in order to control the controlled device CD1 to operate accordingly.

As described above, the wireless detection and control device 1 can not only control the lighting device A according to the detection signal S1 for the lighting device A to operate accordingly, but also can control the controlled device CD1 according to the detection signal S1 for the controlled device CD1 to operate accordingly; therefore, the wireless detection and control device 1 can provide better functions and has extensive application range.

Figure 2:
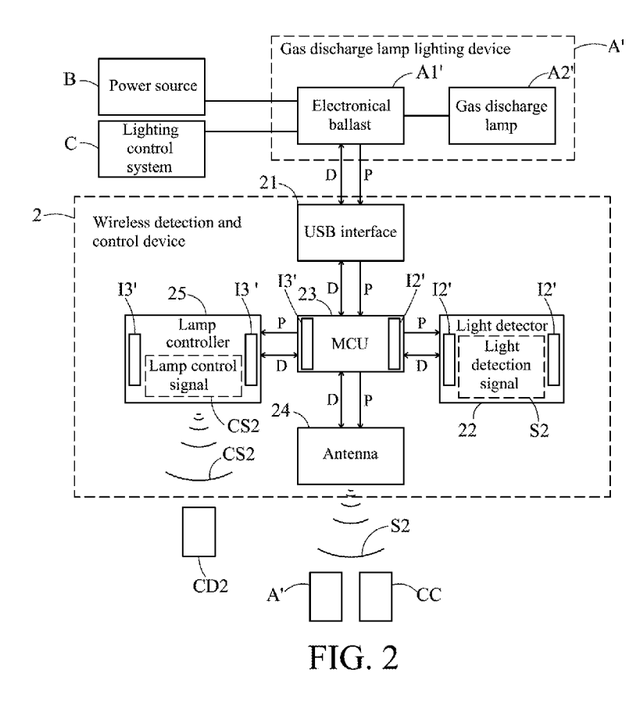
FIG. 2 is a schematic view of a second embodiment of a wireless detection and control device in accordance with the present invention.

Please refer to FIG. 2, which is a schematic view of a second embodiment of a wireless detection and control device in accordance with the present invention; the embodiment illustrates an example applying the wireless detection and control device to a gas discharge lamp lighting device.

As shown in FIG. 2, the wireless detection and control device 2 may be coupled to a gas discharge lamp lighting device A', and the gas discharge lamp lighting device A' may include an electrical ballast A1' and a gas discharge lamp A2'; the electrical ballast A1' may be coupled to the power source B and the lighting control system C, and controlled by the lighting control system C. The wireless detection and control device 2 may include a USB interface 21, a light detector 22, a MCU 23, an antenna 24 and a lamp controller 25.

The MCU 23 may be coupled to the USB interface 21, and may include an I²C interface I2' and a RS485 interface I3'.

The light detector 22 may include two I²C interfaces I2', and the light detector 22 may be detachably coupled to the I²C interface I2' of the MCU 23 via one of its I²C interfaces I2'; the light detector 22 may detect the change of the surrounding environment to generate a light detection signal S2, and the light detector 22 may be coupled to another detector with different function via the other one of its I²C interfaces I2'; accordingly, if the wireless detection and control device 2 needs to be installed with several detectors with different functions, these detectors can be coupled to one another in series via the I²C interfaces I2'.

The antenna 24 may be coupled to the MCU 23. The light detector 22 may transmit the light detection signal S2 to the electrical ballast A1' or transmit the light detection signal S2 to the antenna 24 in order to transmit the light detection signal S2 to other gas discharge lamp lighting devices A' or the control center CC.

In this way, the gas discharge lamp lighting device A' can adjust its brightness according to the light detection signal S2; in addition, the light detector 22 can further transmit the light detection signal S2 to other gas discharge lamp lighting devices A' via the antenna 24 for these gas discharge lamp lighting devices A' to adjust their brightness according to the light detection signal S2, or transmit the light detection signal S2 to the control center CC for the control center CC to take the necessary measures according to the light detection signal S2.

The lamp controller 25 may include two RS485 interfaces I3', and may be detachably coupled to the RS485 interface I3' of the MCU 23 via one of its RS485 interfaces. The light detector 22 may transmit the light detection signal S2 to the lamp controller 25, and the lamp controller 25 may generate a lamp control signal CS2 according to the light detection signal S2 to turn on the standby lamp CD2; besides, the lamp controller 25 may be detachably coupled to a controller with different function via the other one of its RS485 interfaces I3'; accordingly, if the wireless detection and control device 2 needs to be installed with several controllers with different functions, the controllers can be coupled to one another in series via the RS485 interfaces I3'.

As described above, the wireless detection and control device 2 can not only control the gas discharge lamp A' according to the light detection signal S2 for the gas discharge lamp A' to operate according to the light detection signal S2, but also can control the standby lamp CD2 according to the light detection signal S2 for the standby lamp CD2 to operate according to the light detection signal S2; therefore, the wireless detection and control device 2 can provide better functions and be more extensive in application.

Moreover, the special design of the wireless detection and control device 2 can allow the wireless detection and control device 2 to be installed with detectors and controllers with different functions, or replace some detectors and controllers to provide different detection and control functions, which is more flexible in use.

Figure 3:
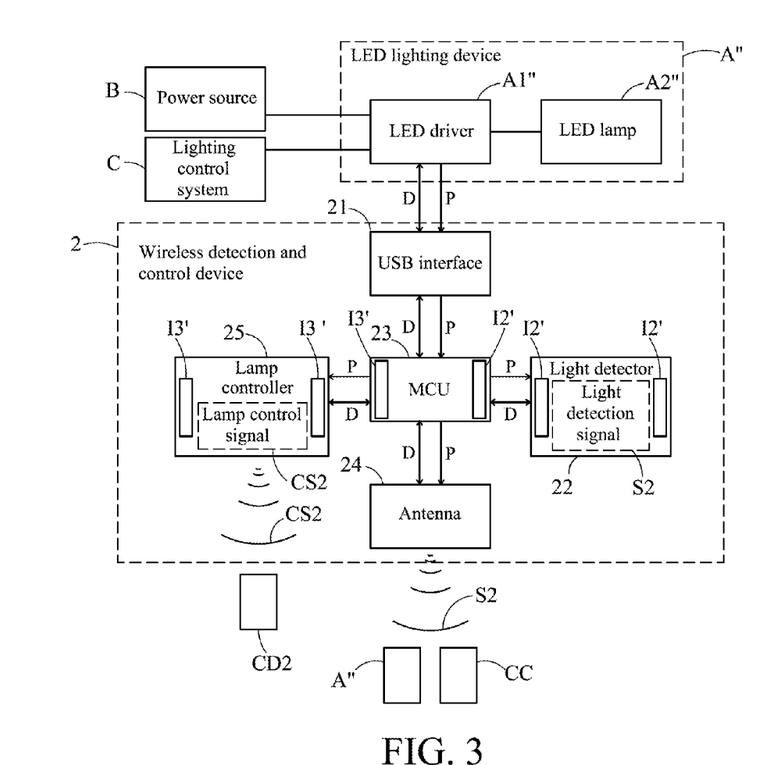
FIG. 3 is a schematic view of a third embodiment of a wireless detection and control device in accordance with the present invention.

Please refer to FIG. 3, which is a schematic view of a third embodiment of a wireless detection and control device in accordance with the present invention; the embodiment illustrates an example applying the wireless detection and control device to a LED lamp lighting device.

As shown in FIG. 3, the wireless detection and control device 2 may be coupled to a LED lamp lighting device A", and the LED lamp lighting device A' may include a LED driver A1" and a LED lamp A2"; the LED driver t A1" may be coupled to the power source B and the lighting control system C, and controlled by the lighting control system C. The wireless detection and control device 2 may include a USB interface 21, a light detector 22, a MCU 23, an antenna 24 and a lamp controller 25.

The MCU 23 may be coupled to the USB interface 21, and may include an I²C interface I2' and a RS485 interface I3'.

The light detector 22 may include two I²C interfaces I2', and the light detector 22 may be detachably coupled to the I²C interface I2' of the MCU 23 via one of its I²C interfaces I2'; the light detector 22 may detect the change of the surrounding environment to generate a light detection signal S2, and the light detector 22 may be coupled to another detector with different function via the other one of its I²C interfaces I2'; accordingly, if the wireless detection and control device 2 needs to be installed with several detectors with different functions, these detectors can be coupled to one another in series via the I²C interfaces I2'.

The antenna 24 may be coupled to the MCU 23. The light detector 22 may transmit the light detection signal S2 to the LED driver A1" or transmit the light detection signal S2 to the antenna 24 in order to transmit the light detection signal S2 to other LED lamp lighting devices A" or the control center CC.

In this way, the LED lamp lighting device A" can adjust its brightness according to the light detection signal S2; in addition, the light detector 22 can further transmit the light detection signal S2 to other LED lamp lighting devices A" via the antenna 24 for these LED lamp lighting devices A" to adjust their brightness according to the light detection signal S2, or transmit the light detection signal S2 to the control center CC for the control center CC to take the necessary measures according to the light detection signal S2.

The lamp controller 25 may include two RS485 interfaces I3', and may be detachably coupled to the RS485 interface I3' of the MCU 23 via one of its RS485 interfaces. The light detector 22 may transmit the light detection signal S2 to the lamp controller 25, and the lamp controller 25 may generate a lamp control signal CS2 according to the light detection signal S2 to turn on the standby lamp CD2; besides, the lamp controller 25 may be detachably coupled to a controller with different function via the other one of its RS485 interfaces I3'; accordingly, if the wireless detection and control device 2 needs to be installed with several controllers with different functions, the controllers can be coupled to one another in series via the RS485 interfaces I3'.

As described above, the wireless detection and control device 2 can not only control the LED lamp A" according to the light detection signal S2 for the LED lamp A" to operate according to the light detection signal S2, but also can control the standby lamp CD2 according to the light detection signal S2 for the standby lamp CD2 to operate according to the light detection signal S2; therefore, the wireless detection and control device 2 can provide better functions and be more extensive in application.

Moreover, the special design of the wireless detection and control device 2 can allow the wireless detection and control device 2 to be installed with detectors and controllers with different functions, or replace some detectors and controllers to provide different detection and control functions, which is more flexible in use.

Figure 4:
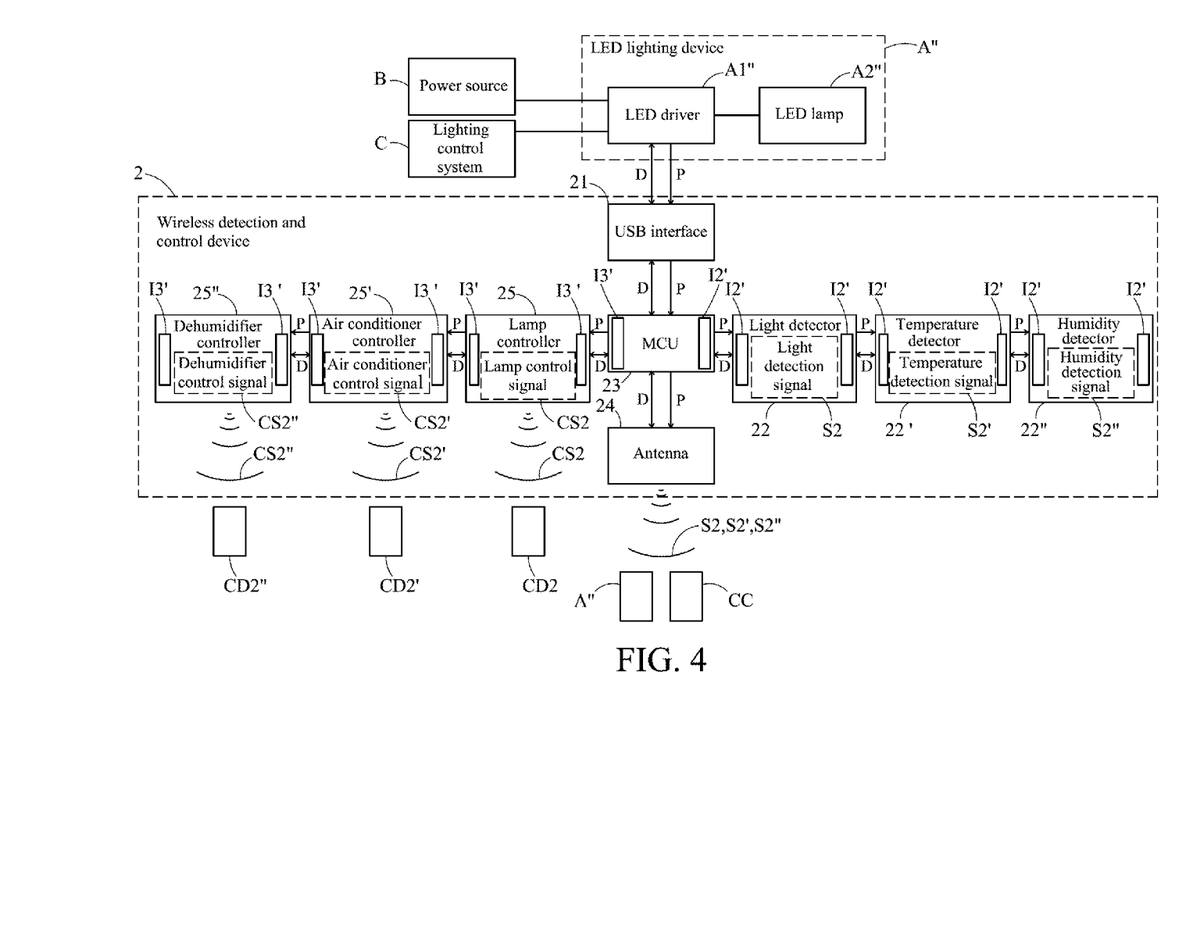
FIG. 4 is a schematic view of a fourth embodiment of a wireless detection and control device in accordance with the present invention.

Please refer to FIG. 4, which is a schematic view of a fourth embodiment of a wireless detection and control device in accordance with the present invention; the embodiment illustrates an example of the wireless detection and control device having several different detection modules and several different controllers.

As shown in FIG. 4, the wireless detection and control device 2 may be coupled to a LED lamp lighting device A", and the LED lamp lighting device A' may include a LED driver A1" and a LED lamp A2"; the LED driver t A1" may be coupled to the power source B and the lighting control system C, and controlled by the lighting control system C.

The wireless detection and control device 2 may include a USB interface 21, a light detector 22, a temperature detector 22', a humidity detector 22", a MCU 23, an antenna 24, a lamp controller 25, an air conditioner controller 25' and a dehumidifier controller 25".

The MCU 23 may be coupled to the USB interface 21, and may include an I$^2$C interface I2' and a RS485 interface I3'.

The light detector 22 may include two I$^2$C interfaces I2', and the light detector 22 may be detachably coupled to the I$^2$C interface I2' of the MCU 23 via one of its I$^2$C interfaces I2', where the light detector 22 may detect the change of the surrounding environment to generate a light detection signal S2. The temperature detector 22' may include two I$^2$C interfaces I2', and may detect the change of the surrounding environment to generate a temperature detection signal S2'. The humidity detector 22" may include two I$^2$C interfaces I2', and may detect the change of the surrounding environment to generate a humidity detection signal S2". The light detector 22, the temperature detector 22', the humidity detector 22" may be coupled to one another in series via the I$^2$C interfaces I2'.

The antenna 24 may be coupled to the MCU 23. The light detector 22 may transmit the light detection signal S2, the temperature detection signal S2' and the humidity detection signal S2" to the LED driver A1" or transmit these detection signals to the antenna 24 in order to transmit these detection signals to other LED lamp lighting devices A" or the control center CC.

In this way, the LED lamp lighting device A" can adjust its brightness according to the light detection signal S2; in addition, the light detector 22 can further transmit the light detection signal S2 to other LED lamp lighting devices A" via the antenna 24 for these LED lamp lighting devices A" to adjust their brightness according to the light detection signal S2, or transmit the light detection signal S2 to the control center CC for the control center CC to take the necessary measures according to the light detection signal S2.

Also, the LED lamp lighting device A" can operate according to the temperature detection signal S2'; in addition, the temperature detector 22' can further transmit the temperature detection signal S2' to other LED lamp lighting devices A" via the antenna 24 for these LED lamp lighting devices A" to operate according to the temperature detection signal S2', or transmit the temperature detection signal S2' to the control center CC for the control center CC to take the necessary measures according to the temperature detection signal S2'.

Similarly, the LED lamp lighting device A" can operate according to the humidity detection signal S2"; in addition, the humidity detector 22" can further transmit the humidity detection signal S2" to other LED lamp lighting devices A" via the antenna 24 for these LED lamp lighting devices A" to operate according to the humidity detection signal S2", or transmit the humidity detection signal S2" to the control center CC for the control center CC to take the necessary measures according to the humidity detection signal S2".

The wireless detection and control device 2 may include more different detectors, or the above detectors can also be replaced by other different detectors, such as $CO_2$ detector, CO detection, gas detector, smoke detector and body detector.

The lamp controller 25 may include two RS485 interfaces I3', and may be detachably coupled to the RS485 interface I3' of the MCU 23 via one of its RS485 interfaces. The air conditioner controller 25' may include two RS485 interfaces I3'. The humidity controller 25" may include two RS485 interfaces I3'. The lamp controller 25, the air conditioner controller 25' and the humidity controller 25" may be coupled to one another in series via the RS485 interfaces I3'.

The light detector 22 may transmit the light detection signal S2 to the lamp controller 25, and the lamp controller 25 may generate a lamp control signal CS2 according to the light detection signal S2 to turn on the standby lamp CD2.

The temperature detector 22' may transmit the temperature detection signal S2' to the air conditioner controller 25', and the air conditioner controller 25' may generate an air conditioner control signal CS2' according to the temperature detection signal S2' to turn on the air conditioner CD2'.

The humidity detector 22" may transmit the humidity detection signal S2" to the dehumidifier controller 25", and the dehumidifier controller 25" may generate an dehumidifier control signal CS2" according to the humidity detection signal S2" to turn on the dehumidifier CD2".

The wireless detection and control device 2 may include more different controllers, or the above controllers can also be replaced by other different controllers to control different controlled devices.

As described above, the wireless detection and control device 2 can not only control the LED lamp A" according to the light detection signal S2, the temperature detection signal S2' and the humidity detection signal S2" for the LED lamp A" to operate according to the light detection signal S,2 the temperature detection signal S2' and the humidity detection signal S2", but also can control the standby lamp CD2, the air conditioner CD2' and the dehumidifier CD2" according to the light detection signal S,2 the temperature detection signal S2' and the humidity detection signal S2" for the standby lamp CD2, the air conditioner CD2' and the dehumidifier CD2" to operate accordingly; therefore, the wireless detection and control device 2 can provide better functions and be more extensive in application.

Moreover, the special design of the wireless detection and control device 2 can allow the wireless detection and control device 2 to be installed with detectors and controllers with different functions, or replace some detectors and controllers to provide different detection and control functions, which is more flexible in use.

It is worthy to point out that the detection module of the conventional wireless detection and control device should be installed on the circuit board of the wireless detection and control device during the manufacturing process; therefore, the users cannot freely select the type of the detection module; accordingly, the wireless detection and control module can provide the detection function, but cannot completely satisfy the requirements of the users, which is very inflexible in use. On the contrary, according to one embodiment of the present invention, the processing module of the wireless detection and control device may include a third connection interface, so the processing module may be detachably coupled to a detection module via the third connection interface; besides, the detection module may also include two third connection interface, so the detection module may be coupled to other detection modules in series; thus, the users can freely select the types of the detection modules according to the requirements, which is more flexible in use.

The conventional wireless detection and control device can be only used to control the lighting device, but cannot be used to control other devices, which limits the application of the wireless detection and control device. On the contrary, according to one embodiment of the present invention, the control module may generate a control signal according to the detection signal of the detection module in order to wiredly or wirelessly control a controlled device; thus, the wireless detection and control device can not only control the lighting device, but also can control other controlled devices, which is more extensive in application.

Also, according to one embodiment of the present invention, the processing module of the wireless detection and control module may include a third connection interface, so the processing module may be detachably coupled to a control module via the third connection interface; besides, the control module may also include two third connection interfaces, so the control module may be coupled to other control modules in series; the users can freely select the types of the control modules according to the requirements, which is more flexible in use.

Besides, according to one embodiment of the present invention, the wireless detection and control module may have several different detection modules and several different control modules, so can provide various detection functions and control functions; thus, the wireless detection and control device can provide abundant and diverse functions.

Moreover, according to one embodiment of the present invention, the processing module of the wireless detection and control module may be selectively coupled to one or more detection modules in series, or one or more control modules; therefore, the users can choose to purchase the detection modules and the control modules which the users want to use, which can further satisfy the requirements of the users and increase the commercial value of the product. As described above, the present invention definitely has an inventive step.

Figure 5:
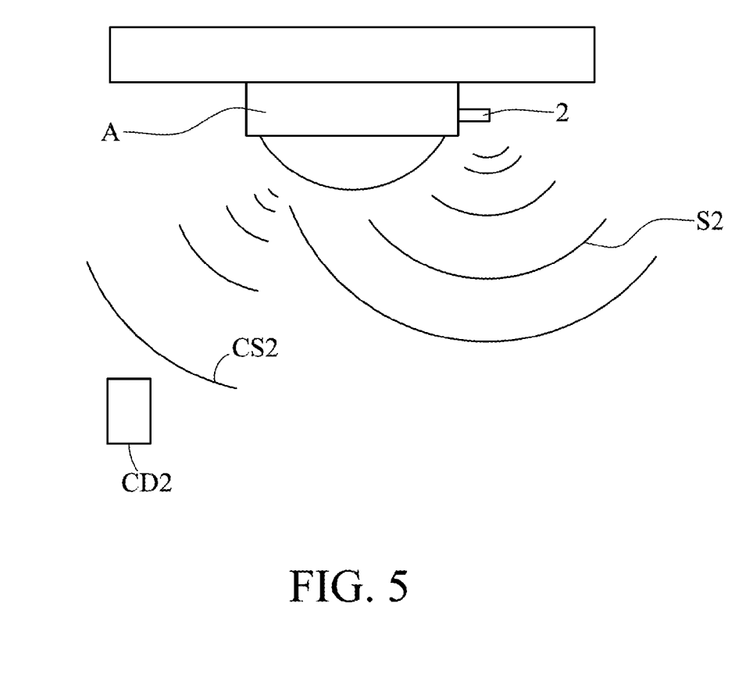
FIG. 5 is a schematic view of a fifth embodiment of a wireless detection and control device in accordance with the present invention.

Please refer to FIG. 5, which is a schematic view of a fifth embodiment of a wireless detection and control device in accordance with the present invention; the embodiment illustrates a preferred use situation of the wireless detection and control device.

As shown in FIG. 5, the wireless detection and control device 2 can be coupled to the lighting device via the USB interface, and the light detector of the wireless detection and control device 2 can transmit the light detection signal S2 to the lighting device A via the USB interface in order to control the lighting device A to operate according to the light detection signal S2, or transmit the light detection signal 2 to other lighting devices via the antenna to control these lighting devices to operate according to the light detection signal S2. In addition, the lamp controller of the wireless detection and control device 2 can generate a lamp control signal CS2 according to the light detection signal S2 so as to control the standby lamp CD2 to operate according to the lamp control signal CS2.

In summation of the description above, according to one embodiment of the present invention, the processing module of the wireless detection and control device may include a third connection interface, so the processing module may be detachably coupled to a detection module via the third connection interface; besides, the detection module may also include two third connection interface, so the detection module may be coupled to other detection modules in series; thus, the users can freely select the types of the detection modules according to the requirements, which is more flexible in use.

According to one embodiment of the present invention, the control module may generate a control signal according to the detection signal of the detection module in order to wiredly or wirelessly control a controlled device; thus, the wireless detection and control device can not only control the lighting device, but also can control other controlled devices, which is more extensive in application.

Also, according to one embodiment of the present invention, the processing module of the wireless detection and control module may include a third connection interface, so the processing module may be detachably coupled to a control module via the third connection interface; besides, the control module may also include two third connection interfaces, so the control module may be coupled to other control modules in series; the users can freely select the types of the control modules according to the requirements, which is more flexible in use.

Besides, according to one embodiment of the present invention, the wireless detection and control module may have several different detection modules and several different control modules, so can provide various detection functions and control functions; thus, the wireless detection and control device can provide abundant and diverse functions.

Moreover, according to one embodiment of the present invention, the processing module of the wireless detection and control module may be selectively coupled to one or more detection modules in series, or one or more control modules; therefore, the users can choose to purchase the detection modules and the control modules which the users want to use, which can further satisfy the requirements of the users and increase the commercial value of the product.

It will be apparent to those skilled in the art that various modifications and variations can be made to the disclosed embodiments. It is intended that the specification and examples be considered as exemplary only, with a true scope of the invention being indicated by the following claims and their equivalents.

What is claimed is:

1. A wireless detection and control device, applicable to a lighting device, and the wireless detection and control device comprising:
   a first connection interface, detachably coupled to a power conversion module of the lighting device, and the power conversion module being coupled to a lighting module of the lighting device;
   a processing module, coupled to the first connection interface;
   a detection module, comprising two second connection interface, wherein the detection module is detachably coupled to the processing module via one of the second connection interfaces in order to detect a change of a surrounding environment to generate a detection signal; and
   a control module, detachably coupled to the processing module;
   wherein the detection module transmits the detection signal to the power conversion module, or transmit the detection signal to the control module for the control module to generate a control signal to control a controlled device.

2. The wireless detection and control device of claim 1, further comprising a wireless communication module, wherein the wireless communication module is coupled to the processing module, and the detection module transmits the detection signal to the wireless communication module to transmit the detection signal.

3. The wireless detection and control device of claim 1, wherein the wireless detection and control device comprises a plurality of the detection modules, and the detection modules are coupled to one another in series via the second connection interfaces.

4. The wireless detection and control device of claim 1, wherein the control module comprises two third connection interfaces, and is detachably coupled to the processing module via one of the third connection interfaces.

5. The wireless detection and control device of claim 1, wherein the processing module is a microcontroller, the power conversion module is an electrical ballast and the lighting module is a gas discharge lamp.

6. The wireless detection and control device of claim 1, wherein the processing module is a microcontroller, the power conversion module is a LED driver and the lighting module is a LED lamp.

7. The wireless detection and control device of claim 1, wherein the detection module comprises two or more of a temperature detector, a light detector, a humidity detector, a $CO_2$ detector, a CO detection, a gas detector, a smoke detector and a body detector.

8. The wireless detection and control device of claim 4, wherein the first connection interface is a USB interface, the second connection interface is a $I_2C$ interface and the third connection interface is a RS485 interface.

9. The wireless detection and control device of claim 4, wherein the wireless detection and control device comprises a plurality of the control modules, and the control modules are coupled to one another in series via the third connection interfaces.

10. The wireless detection and control device of claim 4, wherein the processing module comprises two connection interfaces; one of the connection interfaces is the second connection interface and the other one of the connection interfaces is the third connection interface.

11. A lighting device, comprising a power conversion module, a lighting module and a wireless detection and control device, and the wireless detection and control device comprising:
 a first connection interface, detachably coupled to the power conversion module, and the power conversion module being coupled to the lighting module;
 a processing module, coupled to the first connection interface;
 a detection module, comprising two second connection interface, wherein the detection module is detachably coupled to the processing module via one of the second connection interfaces in order to detect a change of a surrounding environment to generate a detection signal; and
 a control module, detachably coupled to the processing module;
wherein the detection module transmits the detection signal to the power conversion module, or transmit the detection signal to the control module for the control module to generate a control signal to control a controlled device.

12. The lighting device of claim 11, wherein the wireless detection and control device further comprises a wireless communication module; the wireless communication module is coupled to the processing module, and the detection module transmits the detection signal to the wireless communication module to transmit the detection signal.

13. The lighting device of claim 11, wherein the wireless detection and control device further comprises a plurality of detection modules, and the detection modules are coupled to one another in series via the second connection interfaces.

14. The lighting device of claim 11, wherein the control module comprises two third connection interfaces, and is detachably coupled to the processing module via one of the third connection interfaces.

15. The lighting device of claim 11, wherein the processing module is a microcontroller, the power conversion module is an electrical ballast and the lighting module is a gas discharge lamp.

16. The lighting device of claim 11, wherein the processing module is a microcontroller, the power conversion module is a LED driver and the lighting module is a LED lamp.

17. The lighting device of claim 11, wherein the detection module comprises two or more of a temperature detector, a light detector, a humidity detector, a $CO_2$ detector, a CO detection, a gas detector, a smoke detector and a body detector.

18. The lighting device of claim 14, wherein the first connection interface is a USB interface, the second connection interface is a $I_2C$ interface and the third connection interface is a RS485 interface.

19. The lighting device of claim 14, wherein the wireless detection and control device comprises a plurality of the control modules, and the control modules are coupled to one another in series via the third connection interfaces.

20. The lighting device of claim 14, wherein the processing module comprises two connection interfaces; one of the connection interfaces is the second connection interface and the other one of the connection interfaces is the third connection interface.

* * * * *